No. 893,302. PATENTED JULY 14, 1908.
M. S. BLANCH & S. A. ROSEN.
GRINDING ATTACHMENT FOR LAWN MOWERS.
APPLICATION FILED APR. 4, 1907.
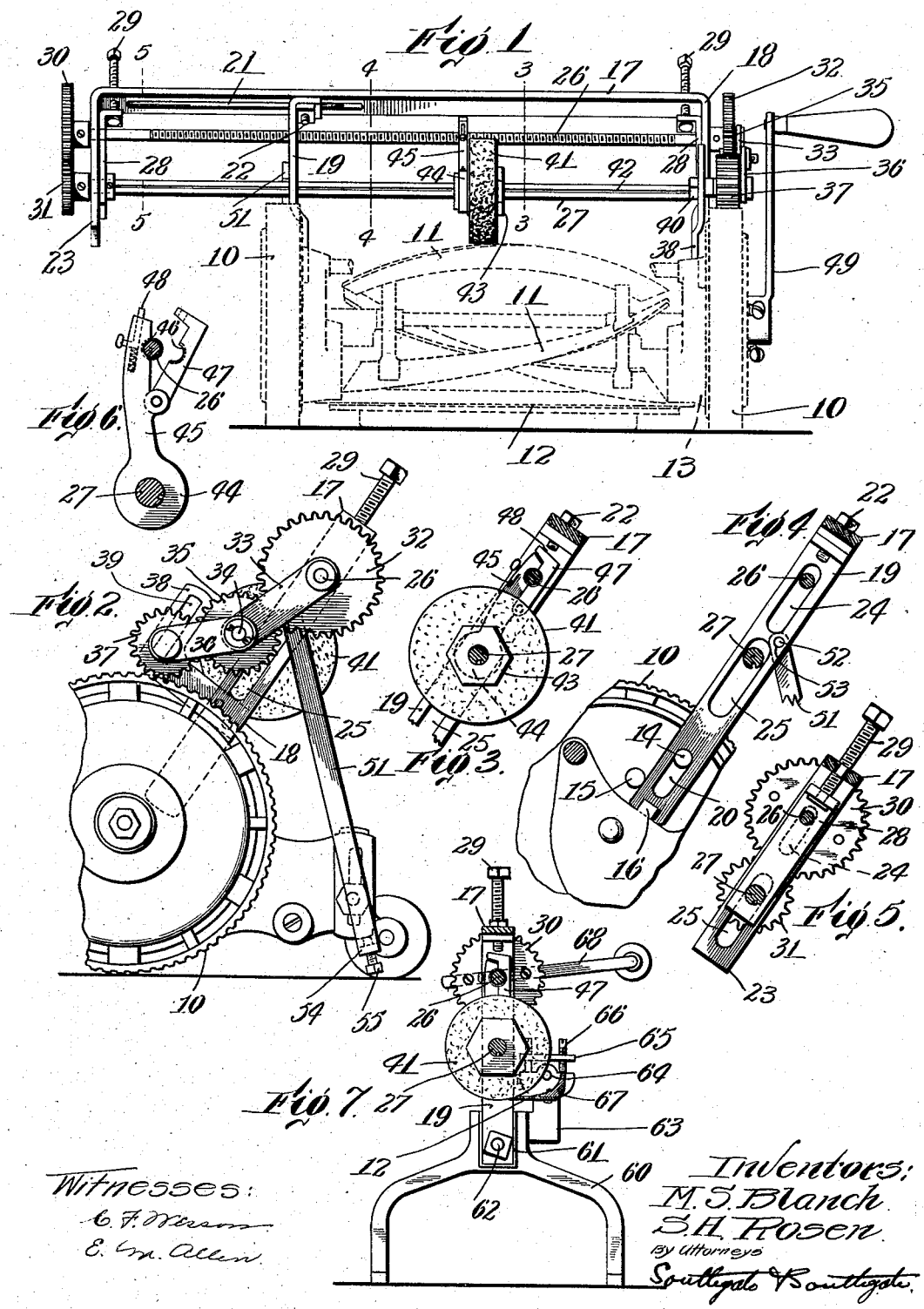
Witnesses:
Inventors:
M. S. Blanch
S. A. Rosen
By Attorneys
Southgate & Southgate

UNITED STATES PATENT OFFICE.

MALCOLM S. BLANCH AND SIXTEN A. ROSEN, OF WORCESTER, MASSACHUSETTS.

GRINDING ATTACHMENT FOR LAWN-MOWERS.

No. 893,302.  Specification of Letters Patent.  Patented July 14, 1908.

Application filed April 4, 1907. Serial No. 366,415.

*To all whom it may concern:*

Be it known that we, MALCOLM S. BLANCH, a citizen of the United States, and SIXTEN A. ROSEN, a subject of the King of Sweden, residing at Worcester, in the county of Worcester and State of Massachusetts, have invented a new and useful Grinding Attachment for Lawn-Mowers, of which the following is a specification.

This invention relates to a device for grinding lawn mowers.

The principal objects of the same are to provide means whereby a grinding device can be readily applied to a lawn-mower in the natural position thereof when the handle is removed, constructed in such a way that its grinding wheel will be in position to be operated to rotate and travel along the knives, and to provide means whereby one of the driving wheels of the lawn mower can be turned so as to impart power to the grinding wheel and operate it simultaneously with the motion of the rotary blades so that they may be ground uniformly.

Further objects of the invention are to provide for adjusting the frame in such a way that it can be applied to a lawn mower of any ordinary size, to provide for adjusting the grinding wheel toward and from the knives, and to provide for setting up the frame in such a way that it can conveniently grind the stationary blade of the lawn mower.

Further objects and advantages of the invention will appear hereinafter.

Reference is to be had to the accompanying drawings which show a preferred form of the invention, and in which Figure 1 is a front elevation of a lawn mower showing the attachment applied thereto ready for operation. Fig. 2 is a side elevation of the same on an enlarged scale. Figs. 3, 4 and 5 are sectional views respectively on the lines 3—3, 4—4 and 5—5 of Fig. 1. Fig. 6 is a view similar to Fig. 3 of a detail showing the parts in different position, and Fig. 7 is a sectional view through the center of the device showing how it is used when employed for grinding the stationary blade of the lawn mower.

The device is shown as applied to an ordinary lawn mower having driving wheels 10, rotary blades 11, and a stationary blade 12.

On the inside of the frame 13 of the lawn mower adjacent to the wheels are located lugs 14, 15 and 16 by which the handles of the lawn mower ordinarily are located in position.

It is the design of this invention to provide a grinding device which may readily be mounted in place of the handle. It is shown as comprising a frame 17 having two supporting arms 18 and 19. Each of these arms has a slot 20 for the lug 14, while it is so shaped at its end that the lugs 15 and 16 engage it to hold it in position. The arm 18 is preferably integral with the frame 17, while the arm 19 is adjustable along the frame. For this purpose the frame has a longitudinal slot 21 near one end, and a screw or bolt 22 passes through a flange on the arm 19 and through the slot to secure the arm 19 in any desired adjusted position, so that the frame may be mounted on lawn mowers of different widths. At the outer end the frame 17 has another arm 23 similar in some respects to the arm 18, but not constituting a support for the frame. The arms 18, 19 and 23 are provided with slots 24 and 25 through which pass a screw 26 and a shaft 27. The screw and shaft are thus free to move inwardly and outwardly along the frame 17. They are journaled in a frame consisting of two movable members 28, each of which is provided with a screw 29 engaging the frame 17 whereby the screw and shaft may be adjusted along the slots 26 and 27. The screw and shaft are provided with gears 30 and 31 meshing with each other, whereby the rotation of one is transmitted to the other. For the purpose of driving the screw and shaft from the wheel 10 which is ordinarily provided with a notched or toothed outer surface, a gear 32 is mounted on the opposite end of the screw. On the screw 26 as a center a link 33 is pivoted and it supports a stud 34 on which is mounted an intermediate gear 35 meshing with the gear 32. A second link 36 supports a gear or pinion 37 which meshes with the gear 35, and is adapted to engage the outer surface of the driving wheel 10. For the purpose of fixing the gear or pinion 37 in proper position, an arm 38 extends upwardly from the arm 18 and is provided with a slot 39 through which the stud of the gear 37 may pass. This stud is provided with a screw threaded portion on which a nut 40 is threaded to fix the gear or pinion in proper position. The shaft 27 supports a grinding wheel 41 which is movable along the shaft, which has a longitudinal slot 42. A bearing 43 for the grinding wheel has a projection, not shown, for engaging said slot. This bearing also has a groove in which is mounted a collar 44 on which is an arm 45 having a split nut 46 thereon for engaging the screw 26. This split nut comprises a swinging member 47 adapted to be fixed in position by a pin 48 mounted on the arm 45.

It will be seen from what has been stated that by the rotation of the driving wheel 10 as by means of a crank 49 which may be applied thereto, the screw 26 and shaft 27 are turned, which results in rotating the grinding wheel and in causing it to travel along the blades. Obviously the rotation of the driving wheel also turns the rotary blades so that all these motions are simultaneous.

Preferably the gear 31 is considerably smaller than the gear 30 so that the rotation of the grinding wheel is rapid.

In order to assist in holding the frame in position a pair of links 51 are employed. Each link has a projection 52 adapted to engage in a perforation 53 in the arms 18 and 19, and it is provided with a flange 54 through which a screw 55 passes. This screw bears on the under side of the projection on the frame of the lawn mower which holds the stationary blade. By tightening these screws the frame can be accurately and securely fixed in position for operation.

When it is desired to grind the stationary blade the device is set up in a different way. A pair of end pieces 60 which together constitute a supporting frame are set up on a table or the like, and the supporting arms 18 and 19 are fixed in depressions 61 therein by means of bolts 62 as indicated in Fig. 7. Each of the end pieces 60 has an arm 63 extending upwardly therefrom. Each arm has a perforation 64 and a flange 65 which supports a pair of screws 66 similar to the two screws on the lawn mower frame which adjust the stationary blade. To operate the device for this purpose the stationary blade and its support 67 are taken off the machine and screws put through the perforations 64 to hold the frame in position. Then the screws 66 are adjusted in the desired way. The frame 17 having been set up as before described, the crank 49 or the separate crank 68 if desired is applied to the wheel 30, and the same rotated. This gives the traveling and rotating movement to the grinding wheel to properly grind the edge of the blade 12. The operation and utility of the device will be obvious from the above description.

While we have illustrated and described a particular form in which we prefer to embody the invention, we are aware that many modifications may be made therein by persons skilled in the art without departing from the scope of the invention as expressed in the claims. Therefore, we do not wish to be limited to the particular form shown, but What we do claim is:—

1. An attachment adapted to be applied to a lawn mower when the handle is removed therefrom and attached to the frame in the place of the handle, said attachment having a grinding device thereon.

2. A grinding attachment for lawn mowers comprising a pair of relatively adjustable supporting arms adapted to be applied to a lawn mower frame when the handle is removed in the place in which the handle thereof is normally located.

3. In a grinding attachment for lawn mowers, the combination of a frame, a grinding device thereon, and a pair of supporting arms for the frame, one of said arms being adjustable along the frame to permit its attachment to lawn mowers of different widths, said arms being applicable to the lawn mower frame when the handle is removed in the place where the handle is normally attached.

4. In a grinding attachment for lawn mowers, the combination of a frame having a longitudinal slot near one end thereof, said frame having a supporting arm integral with the other thereof, a second supporting arm adjustably connected with the frame through said slot, said arms having slots at their ends adapted to engage over the lugs on the frame to which the handles are ordinarily secured, and the ends of said arms engaging other lugs on the frame to assist in holding the frame in position.

5. In a grinding attachment for lawn mowers, the combination of a frame, a pair of arms therefor, one of said arms being adjustable along the frame, said arms having means for engaging lugs on the frame, whereby the arms may be held in the position of the handles of the lawn mower, and braces removably connected with said arms, and each having a screw in its end adapted to engage the rear part of the frame of the lawn mower to clamp the grinding frame in position thereon.

6. In a grinding attachment for lawn mowers adapted to be supported by the lawn-mower itself in its ordinary position, the combination of a frame, a pair of relatively adjustable supporting arms therefor, a grinding wheel supported by the frame, means for simultaneously rotating and longitudinally moving the grinding wheel, and for simultaneously rotating the rotary blades of the lawn mower to which said attachment is applied.

7. In a grinding attachment for lawn mowers adapted to be supported by the lawn-mower itself in its ordinary position, the combination of a grinding wheel with means for simultaneously rotating and longitudinally moving the grinding wheel, and for simultaneously rotating the rotary blades of the lawn mower.

8. The combination of a lawn mower having rotary blades, and a driving wheel adapted to rotate them, of an attachment adapted to be applied to the lawn mower in place of the handle thereof, said attachment comprising a grinding wheel and gearing connected with said driving wheel and adapted to be rotated thereby for operating the grinding wheel.

9. The combination of a lawn mower having rotary blades and a driving wheel adapted to rotate them, of an attachment adapted to be applied to the lawn mower in place of the handle thereof, said attachment comprising a grinding wheel and gearing connected with said driving wheel and adapted to be rotated thereby for simultaneously rotating and moving the grinding wheel rectilinearly while the blades are being rotated by the driving wheel.

10. The combination with a lawn mower having a driving wheel, of a gear or pinion movably mounted and adapted to engage the surface of the driving wheel to be driven thereby, a rotatable screw adapted to be driven by said gear or pinion, and a grinding wheel connected with the screw to be operated thereby.

11. The combination with a lawn mower having a driving wheel, of a gear or pinion movably mounted and adapted to engage the surface of the driving wheel to be driven by said gear or pinion, a grinding wheel connected with the screw to be moved thereby, and means driven by said pinion for simultaneously rotating said grinding wheel.

12. In a grinding attachment for lawn mowers adapted to be supported by the lawnmower itself in its ordinary position, the combination of a frame, a screw supported thereby, a shaft supported by the frame, means for transmitting the motion of rotation from the screw to the shaft, a grinding wheel slidably mounted on the shaft to turn therewith, and means connected with the grinding wheel for engaging the screw, whereby the grinding wheel will be caused to travel along the shaft.

13. In a grinding attachment for lawn mowers, the combination of a frame having slotted supporting arms, a second frame adjustably mounted on the first frame, means for adjusting the second frame on the first frame, a shaft and a screw journaled in the second frame and movable therewith, gears for connecting said shaft and screw together, a grinding wheel mounted to turn with, and movable along the shaft, and a split nut connected with the grinding wheel to move therewith and adapted to engage said screw.

In testimony whereof we have hereunto set our hands, in the presence of two subscribing witnesses.

MALCOLM S. BLANCH.
SIXTEN A. ROSEN.

Witnesses:
ALBERT E. FAY,
LOUIS W. SOUTHGATE.